United States Patent
Hersans et al.

(10) Patent No.: US 10,942,906 B2
(45) Date of Patent: Mar. 9, 2021

(54) DETECT DUPLICATES WITH EXACT AND FUZZY MATCHING ON ENCRYPTED MATCH INDEXES

(71) Applicant: salesforce.com, inc., San Francisco, CA (US)

(72) Inventors: Alexandre Hersans, Walnut Creek, CA (US); Swaroop Shere, San Francisco, CA (US); Chenghung Ker, Burlingame, CA (US); Parth Vijay Vaishnav, Cupertion, CA (US); Assaf Ben-Gur, Livermore, CA (US); Victor Weilin Liu, San Francisco, CA (US); Daniel McGarry, San Francisco, CA (US); Samatha Sanikommu, Dublin, CA (US)

(73) Assignee: salesforce.com, inc., San Francisco, CA (US)

( * ) Notice: Subject to any disclaimer, the term of this patent is extended or adjusted under 35 U.S.C. 154(b) by 170 days.

(21) Appl. No.: 16/026,819

(22) Filed: Jul. 3, 2018

(65) Prior Publication Data

US 2019/0370363 A1     Dec. 5, 2019

Related U.S. Application Data

(60) Provisional application No. 62/678,812, filed on May 31, 2018.

(51) Int. Cl.
*G06F 16/00* (2019.01)
*G06F 16/215* (2019.01)
(Continued)

(52) U.S. Cl.
CPC ........ *G06F 16/215* (2019.01); *G06F 16/2237* (2019.01); *G06F 16/2365* (2019.01);
(Continued)

(58) Field of Classification Search
None
See application file for complete search history.

(56) References Cited

U.S. PATENT DOCUMENTS 5,819,291 A * 10/1998 Haimowitz ......... G06F 16/9014
6,052,693 A *  4/2000 Smith .................... G06F 16/86

(Continued)

OTHER PUBLICATIONS

International Search Report for Application No. PCT/US2019/034585, dated Aug. 6, 2019, 3 Pages.

*Primary Examiner* — Debbie M Le
(74) *Attorney, Agent, or Firm* — Sterne, Kessler, Goldstein & Fox P.L.L.C.

(57) ABSTRACT

Disclosed herein are system, method, and computer program product embodiments for detecting duplicates with exact and fuzzy matching on encrypted match indexes using an encryption key in a cloud computing platform. An embodiment operates by determining a match rule index value upon reception of a new record. The embodiment encrypts the match index rule value using the customer's encryption key and a deterministic encryption method and stores the encrypted match rule index value. Duplicate detection may be later performed by using the same deterministic encryption method to determine a cypher text for a candidate entry and comparing the ciphertext to the stored encrypted match indexes.

20 Claims, 8 Drawing Sheets

(51) Int. Cl.
*G06F 21/60* (2013.01)
*G06Q 30/00* (2012.01)
*G06F 16/22* (2019.01)
*G06F 16/23* (2019.01)
*G06F 16/2458* (2019.01)

(52) U.S. Cl.
CPC ........ *G06F 16/2468* (2019.01); *G06F 21/602* (2013.01); *G06Q 30/01* (2013.01)

(56) References Cited

U.S. PATENT DOCUMENTS

| | | | |
|---|---|---|---|
| 8,078,651 B2* | 12/2011 | Desai | G06F 16/221 |
| | | | 707/812 |
| 8,943,059 B2* | 1/2015 | Rozenwald | G06F 16/355 |
| | | | 707/737 |
| 9,256,764 B2* | 2/2016 | Aissi | G06F 21/64 |
| 9,544,134 B2* | 1/2017 | Aissi | G06F 21/64 |
| 10,204,141 B1* | 2/2019 | Semprevivo | G06F 16/2365 |
| 10,430,423 B1* | 10/2019 | Poddar | G06F 16/951 |
| 2014/0189348 A1 | 7/2014 | El-Shimi et al. | |
| 2016/0232362 A1 | 8/2016 | Conway | |
| 2017/0177899 A1 | 6/2017 | Ng et al. | |

* cited by examiner

400

| Custom Field Definition Edit [Save] [Cancel] |
|---|

Field Information                                        ❗ = Required Information Field Label    [Encrypted Field]—402       Data Type    Text
Field Name   ❗[Encrypted_Field]—404
Description     [                    ]—406
Help Text      [                    ]—408
                [ⓘ]

General Options

Required    ☐ Always require a value in this field in order to save a record
Unique      ☐ Do not allow duplicate values
            ☐ Treat "ABC" and "abc" as duplicate values (case insensitive)
            ◉ Treat "ABC" and "abc" as different values (case insensitive)
External ID ☐ Set this field as the unique record identifier from an external system
Encrypted   ☒ Encrypt the contents of this field [ⓘ]
410          ○ Use probabilistic encryption
   412       ● Use case sensitive deterministic encryption
            Show Formula Editor
Default     [                    ]
Value Use formula syntax: Enclose text and picklist value API names in double quotes :
("the_text"), include numbers without quotes : (25), show percentages as decimals:
(0.10), and express date calculations in the standard format: (Today() +7)

FIG. 4

DETECT DUPLICATES WITH EXACT AND FUZZY MATCHING ON ENCRYPTED MATCH INDEXES

CROSS REFERENCE TO RELATED APPLICATIONS

This application claims the benefit of U.S. Provisional Patent Application 62/678,812 by Hersans, et al., "Detect Duplicates with Exact and Fuzzy Matching on Encrypted Match Indexes," filed May 31, 2018, which is incorporated by reference herein in its entirety.

BACKGROUND

Generally speaking, an organization or individual may utilize a cloud computing platform to manage relationships with customers. Such a cloud computing platform may be referred to as a customer relationship management (CRM) solution. A CRM solution may include a wide-range of features such as contact management, sales management, and productivity tools to better track and analyze interactions with customers and potential customers. A CRM solution may accumulate large amounts of data to support these features.

Keeping this data clean, up-to-date, and free from duplicates optimizes and enhances the performance and analytical utility of a CRM solution. However, cleaning the data may present challenges. For example, for purposes of data security, where customers need to encrypt data with an encryption key they control, CRM solutions may encrypt particular data fields or entities at-rest with the customer's encryption key. Such tenant-level encryption may further complicate duplicate detection and elimination in a CRM solution.

BRIEF DESCRIPTION OF THE DRAWINGS

The accompanying drawings are incorporated herein and form a part of the specification.

FIG. 4 reflects a screenshot of an encryption configuration screen for a custom field in a cloud computing platform, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
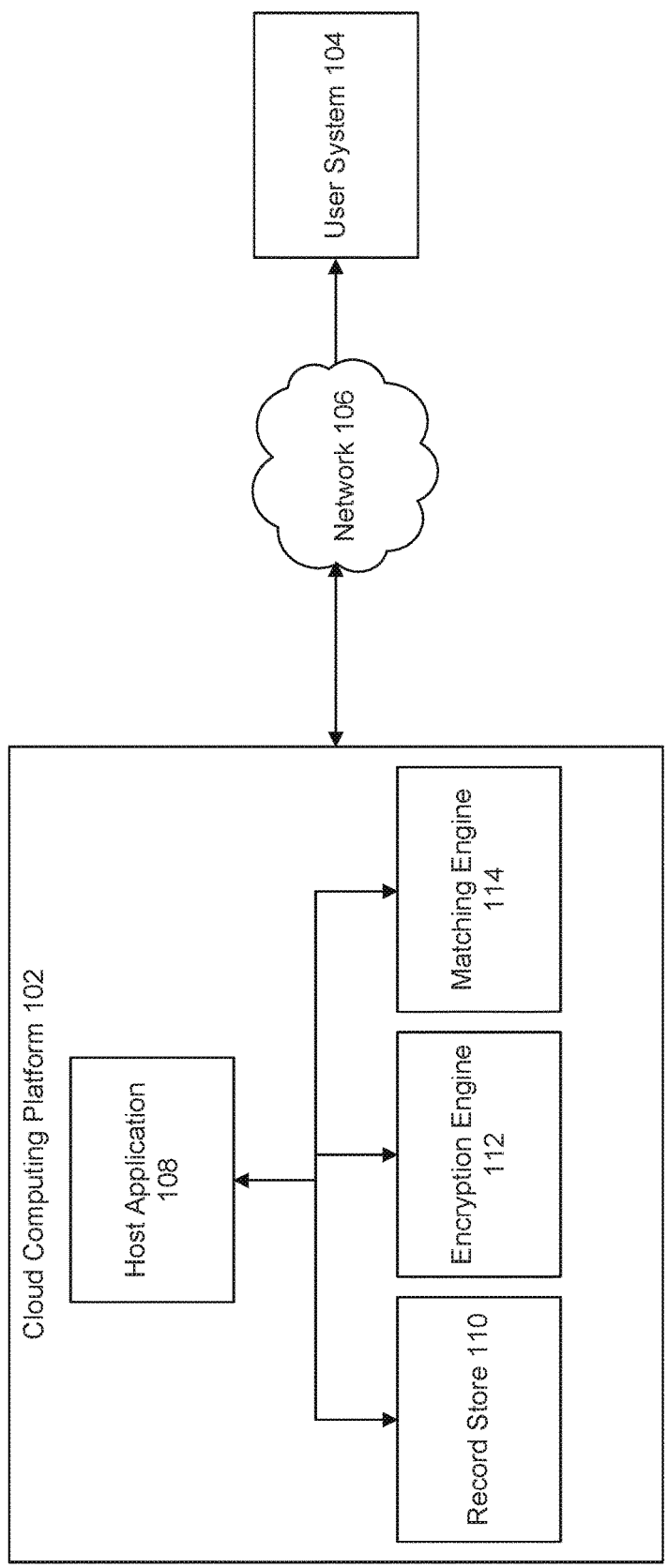
FIG. 1 is a block diagram of a cloud computing system, according to some embodiments, FIG. 2 reflects a screenshot of a detected duplicate in a cloud computing platform, according to some embodiments.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment does not necessarily include the particular feature, structure, or characteristic. Moreover, such phrases do not necessarily refer to the same exemplary embodiment. Further, when the disclosure describes a particular feature, structure, or characteristic in connection with an exemplary embodiment, those skilled in the relevant arts will know how to affect such feature, structure, or characteristic in connection with other exemplary embodiments, whether or not explicitly described.

The exemplary embodiments described herein provide illustrative examples and are not limiting. Other exemplary embodiments are possible, and modifications may be made to the exemplary embodiments within the spirit and scope of the disclosure. Therefore, the Detailed. Description does not limit the disclosure. Rather, the below claims and their equivalents define the scope of the disclosure.

Hardware (e.g., circuits), firmware, software, or any combination thereof may be used to achieve the embodiments. Embodiments may also be implemented as instructions stored on a machine-readable medium and read and executed by one or more processors. A machine-readable medium includes any mechanism for storing or transmitting information in a form readable by a machine (e.g., a computing device). For example, in some embodiments a machine-readable medium includes read-only memory (ROM); random-access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, and/ or instructions may be described herein as performing certain actions. However, these descriptions are merely for convenience, and these actions result from computing devices, processors, controllers, or other devices executing the firmware, software, routines, and/or instructions. Further, any implementation variations may be carried out by a general purpose computer, as described below.

Any reference to the term "module" shall be understood to include at least one of software, firmware, and hardware (such as one or more circuit, microchip, or device, or any combination thereof) or any combination thereof. In addition, those skilled in relevant arts will understand that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will fully reveal the general nature of the disclosure so that others can, by applying knowledge of those skilled in relevant arts, readily modify and/or customize for various applications such exemplary embodiments, without undue experimentation and without departing from the spirit and scope of the disclosure. Therefore, such modifications fall within the meaning and plurality of equivalents of the exemplary embodiments based upon the teaching and guidance presented herein. Here, the phraseology or terminology serves the purpose of description, not limitation, such that the terminology or phraseology of the present specification should be interpreted by those skilled in relevant arts in light of the teachings herein.

Provided herein are system, apparatus, device, method and/or computer program product embodiments, and/or combinations and sub-combinations thereof, for enabling duplicate detection using encrypted match indexes in a cloud computing platform.

Organizations may utilize a cloud computing platform as a CRM solution to manage relationships with customers. The cloud computing platform may allow the organization to track and analyze interactions with customers, increase sales, manage contacts, and better plan for the future. The cloud computing platform may organize customer service flows and supply-chain management and may monitor social media streams to determine potential customers. By tracking interactions with customers through such a cloud computing platform, organizations may ultimately improve profitability, eliminate process inefficiencies, and/or otherwise improve organizational competence.

The cloud computing platform may store assorted and multitudinous data fields related to the organization, sales, customers, suppliers, competitors, leads, etc. Just for example, the cloud computing platform may store fields pertinent to contact information, customer preferences, social media data, customer purchase records, service records, customer interactions, marketing campaigns, sales targets, organizational objectives, sales data, profitability analyses, sales leads/opportunities, etc. Fields may be standard fields, e.g., contacts, accounts, leads, and opportunities, or custom fields designed and utilized by organizations for a particularized purpose tailored to their own organizational requirements.

Because of the potentially sensitive nature of this data, a cloud computing platform may support data encryption. Encryption uses a key and an initialization vector while translating the otherwise readable alphanumeric data (i.e., the plaintext) of a field into an encrypted form (i.e., a ciphertext) that is not readable to entities not privy to the key and the initialization vector. The cloud computing platform then stores the encrypted form of the ciphertext. When retrieving the stored data, the cloud computing platform may de-encrypt the ciphertext using the key and the initialization vector.

Both standard and custom fields may be encrypted. Organizations may choose between encryption methodologies, e.g., deterministic and/or probabilistic, to encrypt a data field. A deterministic encryption scheme always produces the same ciphertext for a given plaintext and key. A probabilistic encryption scheme utilizes randomness in the encryption process, resulting in a different ciphertext given the same plaintext and key.

Organizations also have an interest in maintaining clean data in a cloud computing platform. Clean data improves usability, prevents errors, maintains system integrity, and enhances analytical capabilities. One facet of maintaining clean data is the elimination of duplicates in a given data set. Duplicate detection may be managed globally by running duplicate elimination jobs. Duplicate detection may also occur on a table-by-table or case-by-case basis. Duplicate detection may occur automatically when adding a new record to the cloud computing platform.

A cloud computing platform may utilize match rules to detect duplicitous records. A match rule may examine a particular field, or several fields, in the cloud computing platform. A match rule may be standard or custom (i.e., user-defined). A standard match rule may examine predetermined fields for a given data entity to determine if a duplicate exists. For example, a standardized match rule on contacts in a cloud computing platform may examine First-Name, LastName, and Address. A custom match rule examines user-configured fields in a customized fashion. For instance, a custom, user-defined match rule on contacts may be configured to also consider a contact's Title. In this custom rule, a duplicate would only be determined if First-Name, LastName, Address, and Title match. A user may be able to write Boolean logic to specify a match rule or utilize another programmatic manner to specify a match rule.

Duplicate detection may employ an exact matching scheme or a fuzzy matching scheme. In an exact match scheme, only exact matches in the fields will return a positive result, i.e. a match. For example, if duplicate detection examined a FullName field, "John Smith" and "John Smith" would match but "John Smith" and "Jon Smith" would not. Fuzzy matching provides a method that allows non-exact matches to be positively identified as a duplicate. In the example above, "Jon Smith" may be positively identified as a duplicate of "John Smith" using a fuzzy matching scheme. Example approaches to fuzzy matching include: Jaro-Winkler, Kullback-Liebler distance, name variant, keyboard distance, Metaphone 3, and syllable alignment.

A cloud computing platform may further provide duplicate detection on fields encrypted in various fashions, including fields encrypted via the encryption schemes described above. In supporting duplicate detection of these fields, a cloud computing platform may utilize auxiliary stored entries, e.g., match indexes, to facilitate duplicate detection. To avoid storing the plaintext of otherwise encrypted fields, the auxiliary fields may also need to be encrypted. In some embodiments, enabling encryption on fields in a cloud computing platform may interfere with a duplicate detection system that examines those fields. In one non-limiting example, a cloud computing platform may store encrypted fields in a fashion only related to the original seed text through the use of a key and an initialization vector. In such an example, conventional duplicate detection may not work on the encrypted fields because a simple comparison between a match rule composed of unencrypted keys and the encrypted field will not result in a positive identification of a duplicate. In another embodiment, utilizing probabilistic encryption may result in duplicate detection being disabled due to the varying and unpredictable results of a probabilistic encryption scheme. Accordingly, a need exists to allow a cloud computing platform to detect duplicates in encrypted fields by utilizing encrypted match indexes.

FIG. 1 is a block diagram of a system 100, according to some embodiments. Cloud computing system 100 may include cloud computing platform 102, user system 104, network 106, host application 108, record store 110, encryption engine 112, and matching engine 114. System 100 may connect cloud computing platform 102 to user system 104 via network 106. As would be appreciated by a person of ordinary skill in the art(s), cloud computing platform 102 may be connected to multiple user systems 104.

Cloud computing platform 102 may be a server computer, desktop computer, laptop, tablet, mobile device, wearable electronic device, or other electronic device. Cloud computing platform 102 may also be a software platform for cloud computing. For example, cloud computing platform 102 may be Software as a Service (SaaS) cloud platform where a user subscribes to an application accessible via the Internet. Cloud computing platform 102 may provide CRM-related services. Such services may allow organizations to track and analyze interactions with customers. Cloud computing platform 102 may provide a litany of other functionalities.

User system 104 may be a person interacting with cloud computing platform 102. User system 104 may be a cellphone, smartphone, tablet computer, laptop computer, desktop computer, web browser, or any other suitable computing device. User system 104 may be configured to connect to and communicate with cloud computing platform 102. A user of user system 104 may be a business owner, employee, agent, or another suitable individual interacting with information relevant to a business, company, non-profit, governmental agency, or any other suitable organization. Conversely, a user of user system 104 may use cloud computing platform 102 for individual pursuits or reasons unrelated to any business or organizational goals.

Network 106 may be any network or combination of networks including the Internet, a local area network (LAN), a wide area network (WAN), a wireless network, a cellular network, or various other types of networks as would be appreciated by a person of ordinary skill in the art.

Host application 108 may be included in cloud computing platform 102 and may be any suitable type of application. For example, host application 108 may be a CRM application currently running on cloud computing platform 102. In some embodiments, host application 108 may be a web application designed to run inside a web browser. In some other embodiments, host application 108 may be a software application designed to run on a server computer, desktop computer, or other type of electronic device. Host application 108 may be designed and deployed for running on a mobile platform. Host application 108 may run in any suitable operating system environment. As would be appreciated by a person of ordinary skill in the art(s), host application 108 may be another type of software application.

Record store 110 may be a database or other type of data store. A data object may be an item or collection of data. Record store 110 may store fields related to the organization, sales, customers, suppliers, competitors, leads, etc. The fields stored by record store 110 may be standard fields or custom fields. Record store 110 may also store match indexes to be utilized in detecting duplicates. Record store 110 may support encryption of the data fields contained in record store 110.

Encryption engine 112 may be utilized by cloud computing platform 102 to encrypt fields in record store 110 with a deterministic, probabilistic, or other suitable encryption scheme. Encryption engine 112 may be employed by cloud computing platform 102 or host application 108. Encryption engine 112 may encrypt fields in record store 110. Encryption engine 112 may utilize a suitable seed, key, or initialization vector to encrypt the fields in record store 110. Encryption engine 112 may also encrypt match indexes used to detect duplicates in cloud computing platform 102. Encryption engine 112 may retrieve the unique identifier stored in record store 110 for a match rule and use the unique identifier as the key or initialization vector when encrypting a record in record store 110. Encryption engine 112 may subsequently de-encrypt any stored encrypted values for utilization. Encryption engine 112 may utilize or adhere to an appropriate encryption standard or specification such as 2TDEA, 3TDEA, AES-128, AES-192, AES-256, etc.

Matching engine 114 may determine duplicates stored in record store 110. Matching engine 114 may also check new data received by host application 108 prior to inserting the data into record store 110 to ensure that a duplicate will not be introduced by the insertion. Matching engine 114 may be employed by cloud computing platform 102 or host application 108. Matching engine 114 may determine if duplicates presently exist in record store 110 for unencrypted fields by comparing unencrypted fields to a match index created for each record in a data entity. In one embodiment, matching engine 114 may perform a two-phase match wherein the first phase performs exact matching and the second phase performs appropriate fuzzy matching algorithms to determine duplicates, Matching engine 114 may further determine if duplicates exist in record store 110 for encrypted fields, as described in further detail below with reference to FIG. 3 and FIG. 4.

Figure 2:
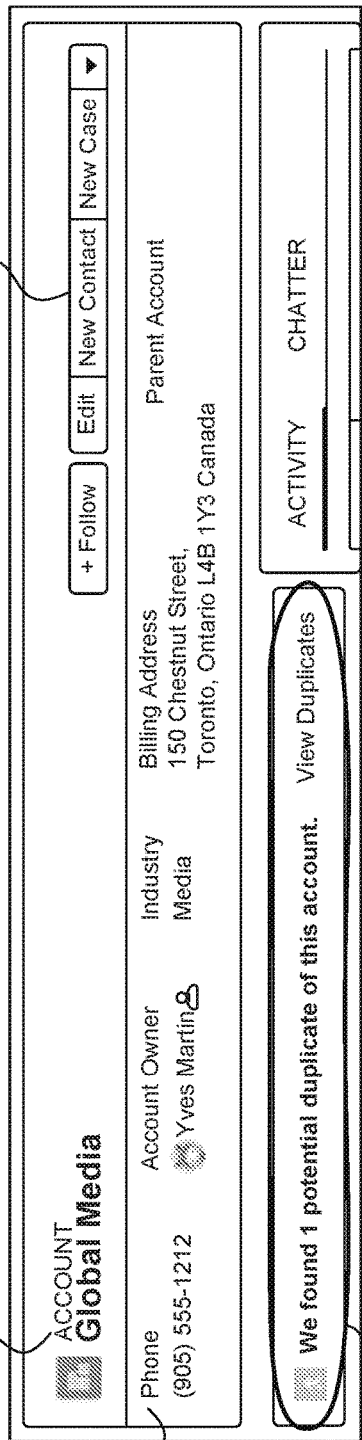

FIG. 2 reflects a screenshot of a detected duplicate in cloud computing platform 102. This is just an exemplary embodiment. FIG. 2 portrays an exemplary interface that includes account 202, new contact button 204, duplicate notification 206, and account details 208. FIG. 2 displays account 202, but this could be another standard or custom field within cloud computing platform 102. New contact button 204 is an exemplary input field that may receive input from a user allowing the user to enter updated information for fields such as contacts, accounts, etc. Duplicate notification 206 may display when the system detects a duplicate through an appropriate method, as elaborated on further in the discussions of FIG. 6 and FIG. 7 below. In this screenshot, solely for example, a match rule may have been created on account name, phone, and owner. Duplicate notification 206 may here display because another record stored in record store 110 may an account name of "Global Media," a phone number of "(905) 555-1212," and an owner of "Yves Martin," Account details 208 may display various fields pertinent to the standard of custom data field being displayed.

Figure 3:
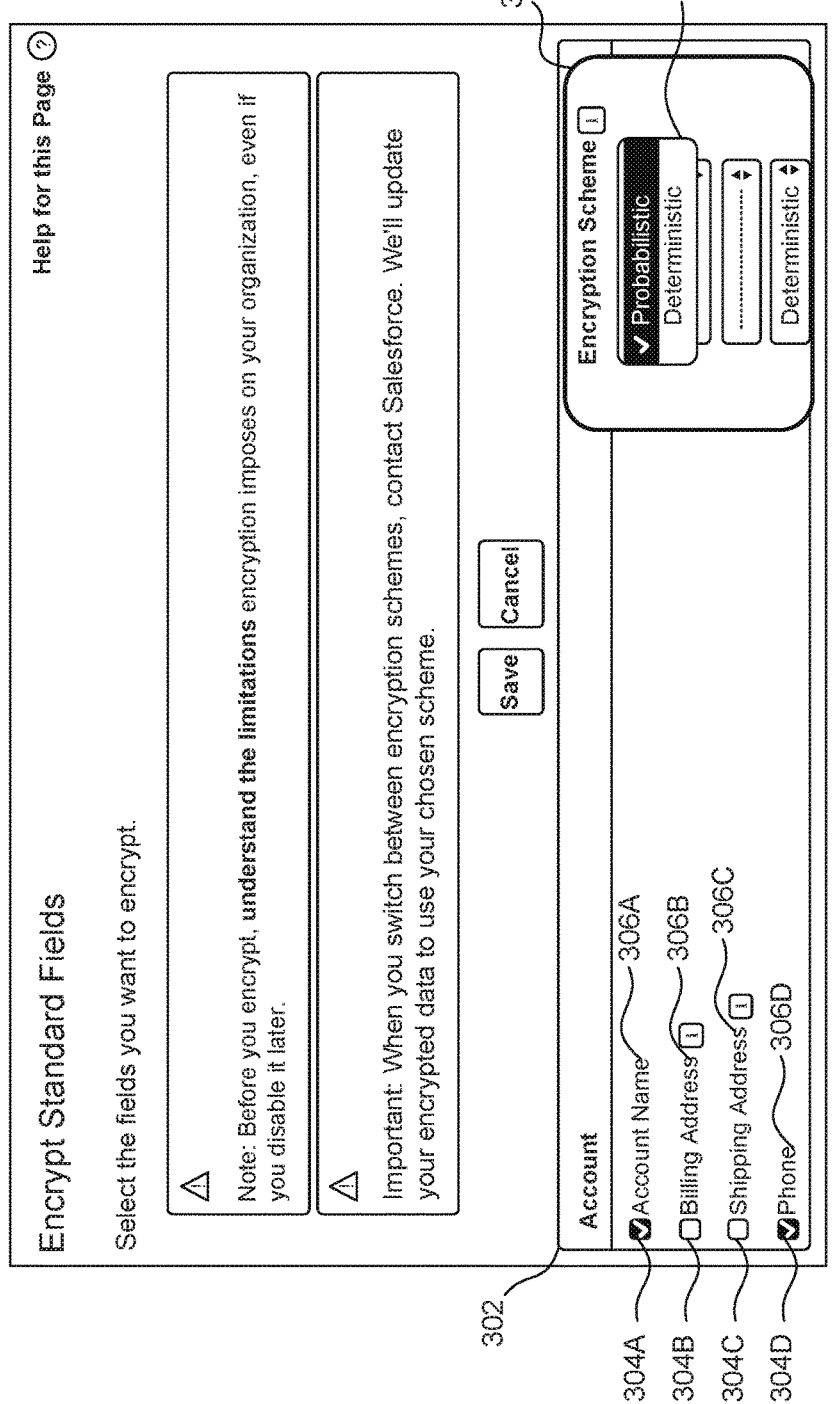
FIG. 3 reflects a screenshot of an encryption configuration screen for a standard field in a cloud computing platform, according to some embodiments.

FIG. 3 reflects a screenshot of an encryption configuration screen for a standard field in cloud computing platform 102. This is just an exemplary embodiment. FIG. 3 portrays an exemplary interface that includes account box 302, checkbox(es) 304, field label(s) 306, encryption settings 308, and type selector 310. FIG. 3 displays an account box 302 but this may be another standard within cloud computing platform 102, e.g., contacts, sales, etc. Checkbox(es) 304 provide a mechanism by which a user may enable encryption across the fields relevant to this exemplary account. Enabling encryption on a standard field may result in encrypting the data as stored in record store 112 as described below with reference to FIG. 6 and FIG. 7. Field label(s) 306 are the labels to the fields relevant to this exemplary. Encryption settings 308 provide a framework for adjusting type selector(s) 310. In this embodiment, type selector(s) 310 indicate either probabilistic or deterministic encryption. One skilled in the arts would appreciate that the fields in account box 302 may vary based on the type of standard data.

FIG. 4 reflects a screenshot of an encryption configuration screen for a custom field in cloud computing platform 102. This is just an exemplary embodiment. FIG. 4 portrays an exemplary interface that includes field label 402, field name 404, description 406, help text 408, encryption enabler 410, and type selector 412. Field label 402, field name 404, description 406, and help text 408 may specify details about a custom field in cloud computing platform 102. Utilizing encryption enable 410, a user may enable encryption on the custom field in cloud computing platform 102. The type of encryption, e.g., deterministic vs. probabilistic may be toggled using type selector 412. Enabling encryption on a custom field may result in encrypting the data as stored in record store 112 as described below with reference to FIG. 6 and FIG. 7.

Figure 5:
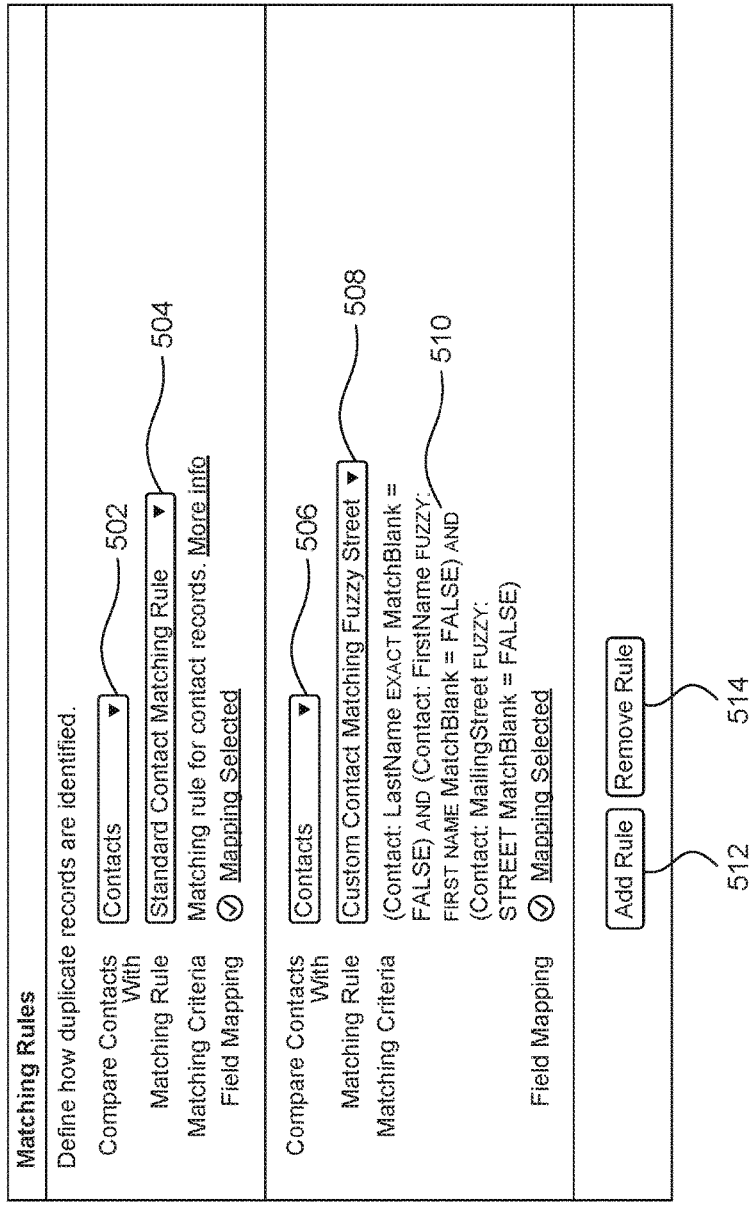
FIG. 5 reflects a screenshot of match rule in a cloud computing platform, according to some embodiments.

FIG. 5 reflects a screenshot of match rule creation screen in cloud computing platform 102. This is just an exemplary embodiment. FIG. 5 portrays an exemplary interface that includes standard selector 502, standard rule selector 504, custom selector 506, custom rule selector 508, criteria string 510, add button 512, and remove button 514. As discussed below with reference to FIG. 7, a match rule may be standard or user-defined. Standard selector 502 and standard rule selector 504 may portray a standard match rule configuration. Custom selector 506, custom rule selector 508, and criteria string 510 may portray a custom match rule. Add rule button 512 and remove button 512 may allow a user to add or remove a match rule. The utilization of match rules in the determination of duplicates in a cloud computing platform is described in further detail below with reference to FIG. 6.

Figure 6:
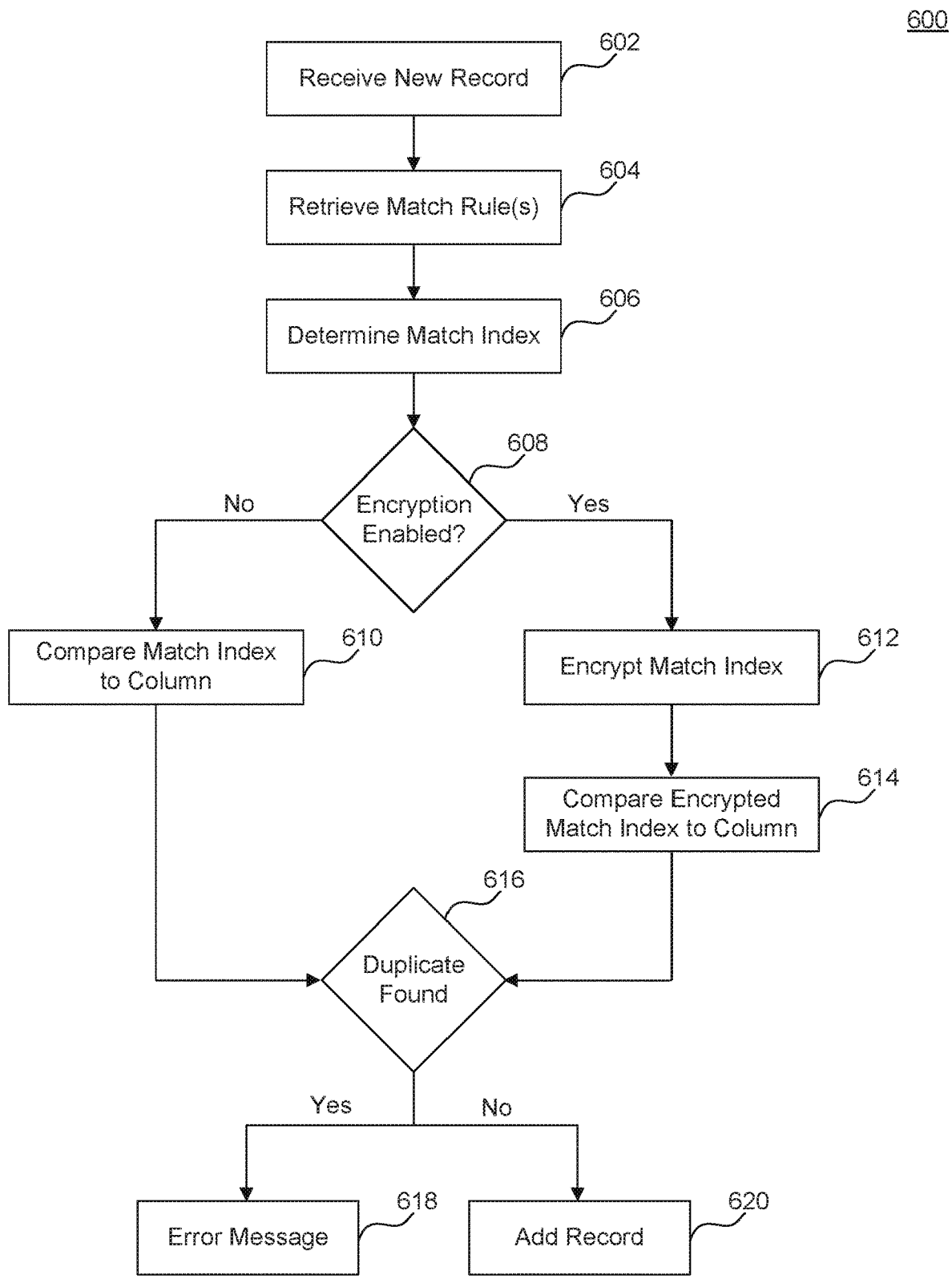
FIG. 6 is a flowchart illustrating a method of duplicate detection when adding a new record in a cloud computing platform, according to some embodiments.

FIG. 6 is a flowchart illustrating a method 600 of duplicate detection when adding a new record in a cloud computing platform, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art. Method 600 shall be described with reference to FIG. 1. However, method 600 is not limited to that example embodiment.

In 602, host application 108 may receive a new record from user system 104. The new record may represent a new standard field such as a contact, account, lead, or opportunity. The new record may also represent a new custom field previously configured within host application 108 via a user of user system 104. The new record may be received using appropriate HTML form data, in XML, or any other suitable information transfer format. In an illustrative example, host application 108 may receive a new Contact comprising a first name ("John"), a last name ("Smith"), a mailing address ("10 Maple Avenue"), a title ("Developer"), and a contact number ("555-5555"). This disclosure will utilize this example in the discussion of the subsequent steps that follows. In an embodiment, such a contact may also be received through an automated process, for example, an import mechanism or other automated propagation of data.

In 604, host application 108 retrieves stored match rules pertinent to the new record received in 602. In the above example, host application 108 may retrieve from record store 110 any match rules configured to detect duplicates on the Contacts field. In an alternate example, host application 108 may receive match rules for a custom data entity. One skilled in the art(s) will understand that more than one match rule may be applicable to a given data entity, depending on configurations stored in record store 110. Thus, host application 108 may retrieve more than one match rule, and in this embodiment, the subsequent steps may be iterative. To continue the above contact example, host application 108 may retrieve a match rule on FirstName, LastName, Address, and Title. Host application may retrieve the fields to which the match rule applies, the type of matching to perform for those fields (fuzzy or exact), and other appropriate configuration information. The match rule may also include a unique identifier stored in record store 110 to identify that particular match rule.

In 606, host application 108 calculates a match index for the new record. The nature of the match index may vary based on the nature of the data being received. Host application 108 may derive a different match index corresponding to each match rule received in 604 if more than one match rule is in place. The match index may be a composite of the data fields received. For the above example, the match index across FirstName, LastName, Address, and Title may be determined to be "JSmithMapleDeveloper." This example is in no way limiting, however, and a multitude of varied approaches may be taken to determine the match index; those approaches may vary based on the nature of the data entity at issue.

In 608, host application 108 determines if encryption is enabled on any of the fields comprising the match index. In the above example, host application 108 may determine from record store 110 if any one of first name, last name, mailing address, title, and a contact number is encrypted. In an embodiment, host application 108 may behave differently if the encryption scheme is probabilistic versus deterministic. In one embodiment, duplicate determination may not function if the encryption scheme is probabilistic. If encryption is enabled for any of the fields, then method 600 moves to 612. If encryption is not enabled for any of the fields, then method 600 moves to 610.

In 610, host application 108 compares the match index determined in 606 to the rows in the relevant data entity in record store 110. Because encryption is not enabled on the fields comprising the match index, records store 110 may store the match index in an unencrypted form. Thus for the above example, hosting application 108 may perform a table scan to determine if "JSmithMapleDeveloper" exists in the relevant data entity in record store 110. Host application 108 may perform any other suitable search mechanism to determine if the match index is duplicative.

In 612, host application 108 encrypts the match index determined in 606 via encryption engine 112. Host application 108 may utilize the unique identifier for the match rule as the initialization vector that keys the encryption scheme. Thus, encryption engine 112 may derive appropriate ciphertext from the "JSmithMapleDeveloper" plaintext. The ciphertext may consist of alphanumeric characters and may be a configurable bit-length.

In 614, host application 108 compares the encrypted match index determined in 612 to the encrypted match index column in the relevant data entity in record store 110. For the above example, hosting application 108 may perform a table scan to determine if the encrypted ciphertext exists in the relevant data entity in record store 110. Host application 108 may perform any other suitable search mechanism to determine if the encrypted match index is duplicative.

In 616, host application 108 determines if a duplicate was found in step 610 or 611. If a duplicate record was found, then method 600 proceeds to 618. If a duplicate record was not found, then method 600 proceeds to 620.

In 618, host application 108 returns an error message indicating that a duplicate record was found. In an embodiment, user system 104 may be asked to confirm the information or update the information if appropriate.

In 620, host application 108 adds the new record to record store 110. The record may include a column housing the match index. If encryption is not enabled for the relevant fields, the match index may be stored in this column. If encryption is enabled, the encrypted match index may be stored in this column.

Figure 7:
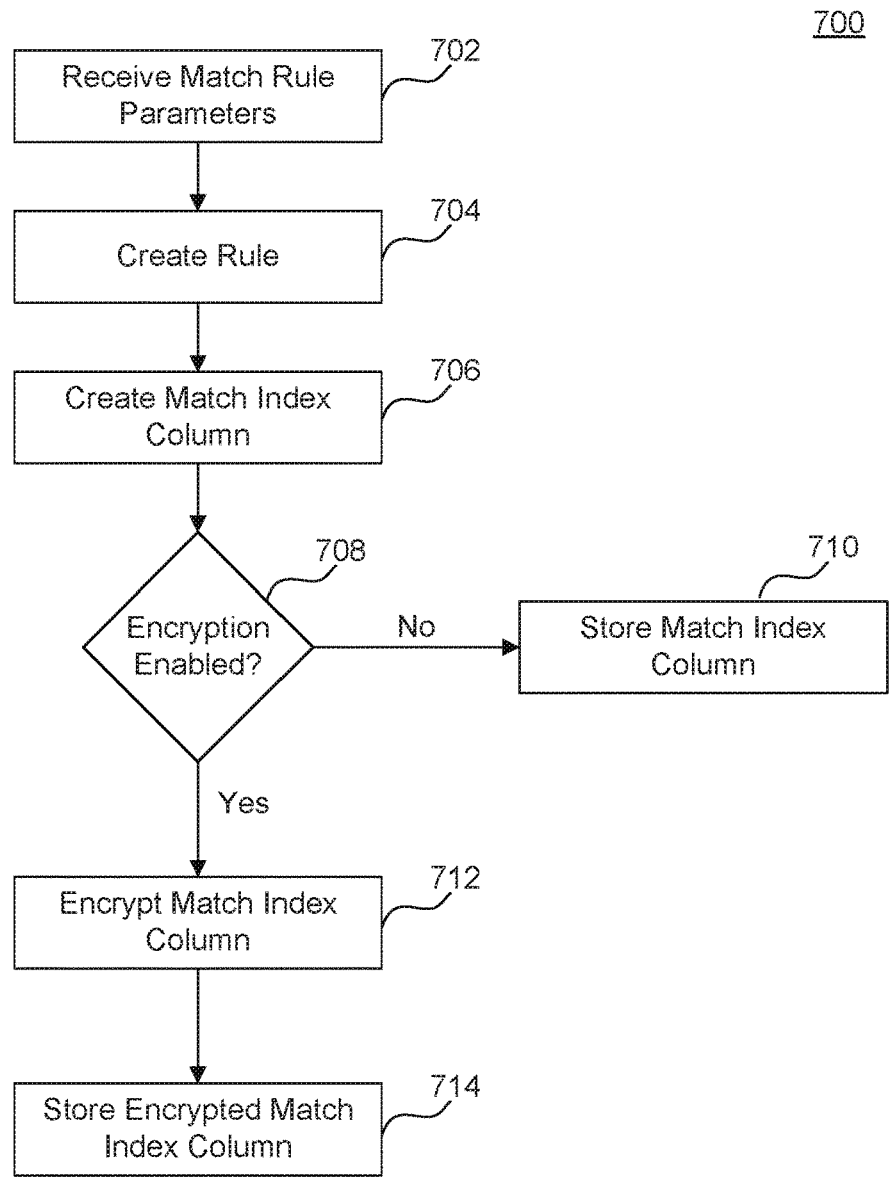
FIG. 7 is a flowchart illustrating a method of creating and encrypting a match index to be used in duplicate detection, according to some embodiments.

FIG. 7 is a flowchart illustrating a method 700 of creating and encrypting a match rule to be used in duplicate detection, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art. Method 700 shall be described with reference to FIG. 1. However, method 700 is not limited to that example embodiment.

In 702, host application 108 receives match rule parameters from a user of user system 704. The parameters may specify the data entity (i.e., table) to which the match rule applies, the fields in the data entity to which the match rule applies, Boolean or other logic specifying how the match rule should behave, whether blanks or null values should be treated as a match, and other suitable configuration information. The match rule parameters may be received using appropriate HTML form data, in XML, or any other suitable information transfer format. In one embodiment, host application could receive match rule parameters updating an existing rule.

In 704, host application 108 may create the match rule in record store 110. Host application may allow more than one match rule to examine the same fields, however, suitable redundancy checks may be performed. Appropriate rows and columns may be added to particular tables in order to track the match rule. When modifying an existing match rule, host application 108 may perform updates to the underlying table as opposed to inserts.

In 706, host application 108 may create a match index column based on the entries currently existing in the specified data entity. For example, if the match rule examines FirstName, LastName, and Title, then host application 108 may create an appropriate match index (e.g., "JSmithDeveloper") for each record in the data entity, i.e., each row in the table, based on the data contained in the table. Host application 108 may perform this row by row, in batches, iteratively, recursively, or in any other suitable programmatic fashion. Host application 108 may store the match indexes for each row temporarily in memory, text, temporary database tables, or any other suitable storage medium.

In 708, host application 108 determines if encryption is enabled on any of the fields examined by the match rule. Host application 108 may retrieve data from record store 110 about the fields and data entities for which encryption is enabled. Host application 108 may also fetch information about the type of encryption applied to the data entities. In an embodiment, host application 108 may behave differently based on the type of encryption. If encryption is enabled, then method 700 proceeds to 710. If encryption is not enabled, then method 700 proceeds to 714.

In 710, where encryption is not enabled or needed to store the match index column, host application 108 may store the match index column in record store 110 in unencrypted form.

In 712, host application 108 may encrypt the entirety of the match index column created in 706. Host application 108 may utilize a unique identifier for the match rule as the initialization vector for the encryption scheme. Host application 108 may retrieve the match indexes created in 706 from memory, text, temporary database tables, etc. Host application 108 may encrypt the entries in the match index column one by one, in batches, or in their entirety.

In 714, host application 108 stores the encrypted form of the match index column in record store 110. Host application 108 may store the encrypted match indexes in the column through bulk inserts, database updates, text manipulation, or other suitable storage approach.

Figure 8:
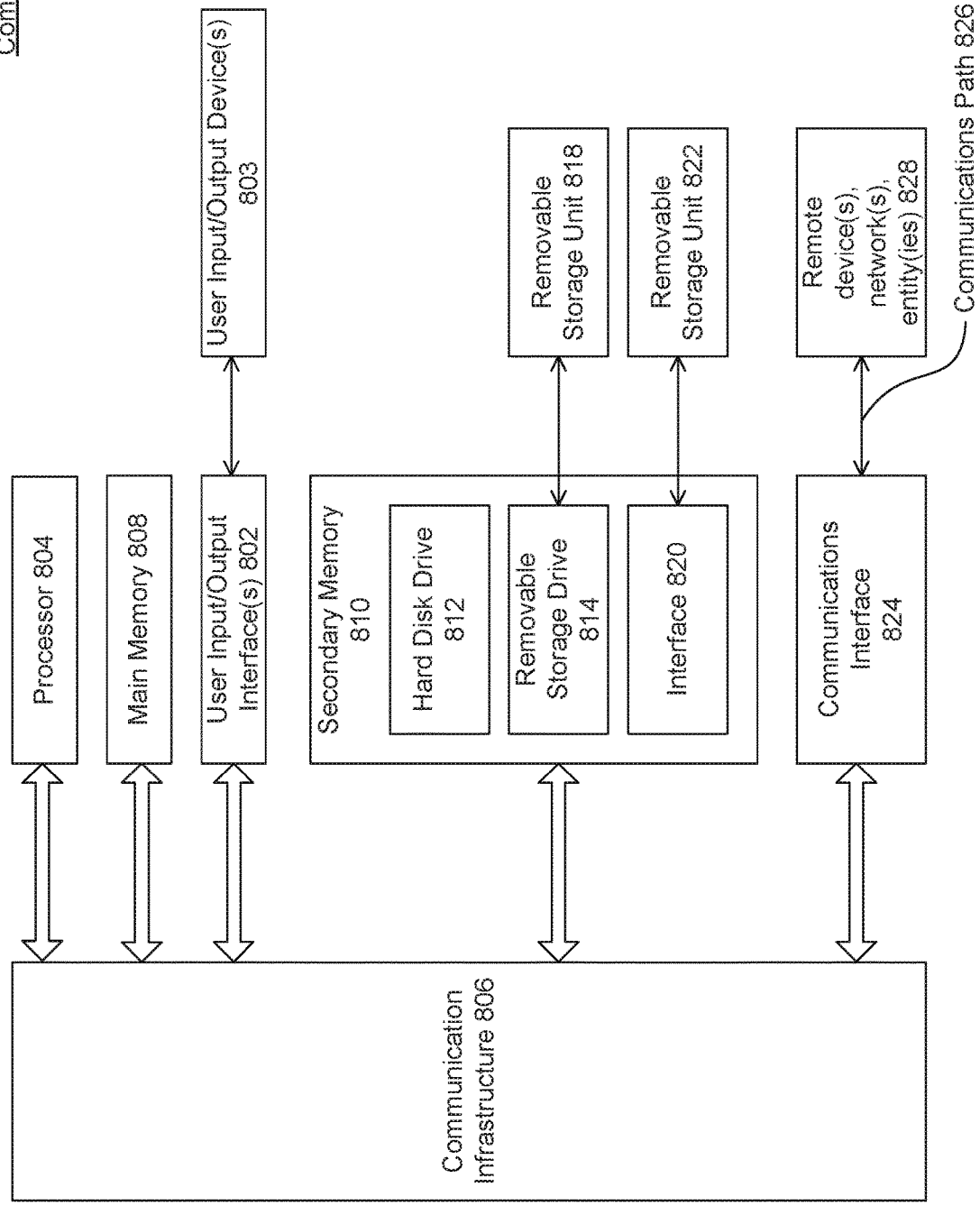
FIG. 8 is an example computer system useful for implementing various embodiments.

Various embodiments can be implemented, for example, using one or more computer systems, such as computer system 800 shown in FIG. 8. Computer system 800 can be used, for example, to implement method 600 of FIG. 6 and method 700 of FIG. 7. For example, computer system 800 can an initialization of an analytics system using pre-set global filters or update. Computer system 800 can be any computer capable of performing the functions described herein.

Computer system 800 can be any well-known computer capable of performing the functions described herein.

Computer system 800 includes one or more processors (also called central processing units, or CPUs), such as a processor 804, Processor 804 is connected to a communication infrastructure or bus 806.

One or more processors 804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure 806 through user input/output interface(s) 802.

Computer system 800 also includes a main or primary memory 808, such as random access memory (RAM), Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WAN, the Internet, etc. Control logic and/or data may be transmitted to and from computer system 800 via communication path 826.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

The breadth and scope of this disclosure should not be limited by any of the above described exemplary embodiments, but should be defined only in accordance with the following claims and their equivalents.

What is claimed is:

1. A method, comprising:
   receiving, by one or more processors, a new record added to a cloud computing platform;
   selecting, by the one or more processors, a match rule applicable to the new record comprising a unique identifier, a match type, and one or more fields of applicability, wherein the match rule defines a duplicate record when performing duplicate detection on the new record;
   calculating, by the one or more processors, an encrypted match index based on the one or more fields of applicability, wherein the unique identifier is used as an initialization vector in an encryption scheme used to create the encrypted match index;
   comparing, by the one or more processors, the encrypted match index to an encrypted match index column to determine if the encrypted match index duplicates a previously generated and stored encrypted match index in the encrypted match index column; and
   when the encrypted match index does not duplicate the previously generated and stored encrypted match index in the encrypted match index column,
   storing, by the one or more processors, the new record in the cloud computing platform and adding the encrypted match index to the encrypted match index column.

2. The method of claim 1, further comprising:
   receiving, by the one or more processors, match rule parameters comprising the match type and the one or more fields of applicability;
   creating, by the one or more processors, the unique identifier based on the one or more fields of applicability; and
   storing, by the one or more processors, a custom match rule comprising the unique identifier, the match type, and the one or more fields of applicability.

3. The method of claim 1, further comprising:
   displaying, by the one or more processors, an error message when the encrypted match index duplicates the previously generated and stored encrypted match index in the encrypted match index column.

4. The method of claim 1, further comprising:
   storing, by the one or more processors, the encrypted match index in an unencrypted form if encryption is not enabled on any of the one or more fields of applicability.

5. The method of claim 1, further comprising:
   scanning, by the one or more processors, the encrypted match index column to determine one or more duplicates; and
   displaying, by the one or more processors, the one or more duplicates in a web interface.

6. The method of claim 1, wherein the match type can be exact or fuzzy.

7. The method of claim 1, wherein the encryption scheme is a deterministic scheme.

8. The method of claim 1, wherein the cloud computing platform is a customer relationship management platform.

9. A system, comprising:
   a memory; and
   at least one processor coupled to the memory and configured to:
   receive a new record added to a cloud computing platform;
   select a match rule applicable to the new record comprising a unique identifier, a match type, and one or more fields of applicability, wherein the match rule defines a duplicate record when performing duplicate detection on the new record;
   calculate an encrypted match index based on the one or more fields of applicability, wherein the unique identifier is used as an initialization vector in an encryption scheme used to create the encrypted match index;
   compare the encrypted match index to an encrypted match index column to determine if the encrypted match index duplicates a previously generated and stored encrypted match index in the encrypted match index column; and
   when the encrypted match index does not duplicate the previously generated and stored encrypted match index in the encrypted match index column,
   store the new record in the cloud computing platform and add the encrypted match index to the encrypted match index column.

10. The system of claim 9, the at least one processor further configured to:

receive match rule parameters comprising the match type and the one or more fields of applicability;

create the unique identifier based on the one or more fields of applicability; and store a custom match rule comprising the unique identifier, the match type, and the one or more fields of applicability.

11. The system of claim 9, the at least one processor further configured to:

display an error message when the encrypted match index duplicates the previously generated and stored encrypted match index in the encrypted match index column.

12. The system of claim 9, the at least one processor further configured to:

scan the encrypted match index column to determine one or more duplicates; and display the one or more duplicates in a web interface.

13. The system of claim 9, the at least one processor further configured to:

store the match index value in an unencrypted form if encryption is not enabled on any of the one or more fields of applicability.

14. The system of claim 9, wherein the match type is exact or fuzzy.

15. The system of claim 9, wherein the match rule further comprises an indicator of whether a blank field should be treated as a match.

16. The system of claim 9, wherein if the match type is fuzzy, the at least one processor can use one of Jaro-Winkler, Kullback-Liebler distance, name variant, keyboard distance, metaphone 3, or syllable alignment to determine a match.

17. The system of claim 9, wherein the encryption scheme is a deterministic scheme.

18. The system of claim 9, wherein the one or more fields of applicability can be standard or custom fields in the cloud computing platform.

19. The system of claim 9, wherein the cloud computing platform is a customer relationship management platform.

20. A non-transitory computer-readable device having instructions stored thereon that, when executed by at least one computing device, causes the at least one computing device to perform operations comprising:

receiving a new record added to a cloud computing platform;

selecting a match rule applicable to the new record comprising a unique identifier, a match type, and one or more fields of applicability, wherein the match rule defines a duplicate record when performing duplicate detection on the new record;

calculating an encrypted match index based on the one or more fields of applicability, wherein the unique identifier is used as an initialization vector in an encryption scheme used to create the encrypted match index;

comparing the encrypted match index to an encrypted match index column to determine if the encrypted match index duplicates a value in the encrypted match index column; and when the encrypted match index does not duplicate a previously generated and stored encrypted match index in the encrypted match index column, storing the new record in the cloud computing platform and adding the encrypted match index to the encrypted match index column.

\* \* \* \* \*